350-174
SEARCH ROOM
T 350/174
X 350/166

Feb. 5, 1957 H. S. BLANKS 2,780,134

COMPACT COLOR TELEVISION PROJECTING APPARATUS

Filed Dec. 29, 1953 2 Sheets-Sheet 1

INVENTOR.
HENRY S. BLANKS

BY Oliver D. Mitchell
ATTORNEY

INVENTOR.
HENRY S. BLANKS

BY Orin Mitchell
ATTORNEY

United States Patent Office 2,780,134

Patented Feb. 5, 1957

2,780,134

COMPACT COLOR TELEVISION PROJECTING APPARATUS

Henry S. Blanks, Chelmsford, England, assignor to Radio Corporation of America, a corporation of Delaware Application December 29, 1953, Serial No. 400,949

10 Claims. (Cl. 88—24)

This invention relates to the projection of color television images and more particularly to a bi-reflective optical system for this purpose.

In order to project a large color television picture, it has heretofore been customary to use several kinescopes each of which has a brilliant image in terms of one color component of a televised object on its face plate. These three kinescopes are disposed facing the concave, aluminized surface of each of three concave mirrors which fuse the light from each face plate into one optical image as it is reflected onto a viewing surface. The customary correction plate or lens is used in conjunction with this system to correct for spherical aberration.

Other systems involve the use of crossed dichroic mirrors used in conjunction with three image producing tubes and three spherical mirrors such as the one described in U. S. Patent No. 2,590,240 issued to D. W. Epstein. Bi-reflective systems have also been known in which three image producing means are situated toward the front and to the side of a single spherical mirror. The image of each tube is focused on one of three plane mirrors located in front of the spherical mirror which reflects the image on to the spherical mirror. The latter in turn reflects the images through a correcting plate to form a single image on a viewing surface.

Where it is desired to effect greater compactness and to conserve space required for projection apparatus, the present invention will prove extremely useful.

The present invention contemplates the use of a so-called bi-reflective optical system in which the image appearing on each of three kinescopes is reflected from a corresponding plane mirror onto a conventional concave spherical mirror. The concave mirror then projects the image formed by all three kinescopes on to a viewing surface by way of a correction lens. If three individual concave mirrors were to be used, it is obvious that the space required therefor would be larger than if only one concave mirror were employed.

In accordance with the present invention, three individual kinescopes are placed on the convex side of one concave mirror. The kinescopes produce a monochromatic image in response to voltages representative of a different one of three sélected component colors in the televised object. The part or area of the mirror immediately opposite each of the three kinescopes is not aluminized on its concave side or otherwise made reflective, but is rather covered with a dichroic coating which transmits the image on the kinescope closest to it in terms of one color and reflects all other colors. Except for these areas which have a dichroic coating, the inner concave surface of the mirror is aluminized as are ordinary mirrors of this type. A group or cluster of three inclined planar and interleaved dichroic mirrors is placed as the object of the spherical mirror. When an image appears on any one of the kinescopes, its light is transmitted through the dichroic coated area nearest it on the spherical mirror on to a particular planar dichroic mirror of the cluster. This latter mirror reflects the particular colored image light back to the concave mirror which in turn projects the light of the image through an appropriate correction lens onto a viewing screen.

It is an object of this invention to provide a system for projecting a multi-colored image onto a viewing surface.

Another object of this invention is to provide a compact system of color television projection wherein only one concave mirror is employed.

A further aim of this invention is to provide a compact bi-reflective color television projection system having only one mirror and one correction plate.

Still another purpose of the invention is to provide a convenient method of mounting a plurality of plane mirrors as the object of a concave spherical mirror.

Other objects and features of the invention, as well as a more complete understanding of its nature will become readily apparent through a reading of the following description in conjunction with the accompanying drawings in which.

Figure 1:
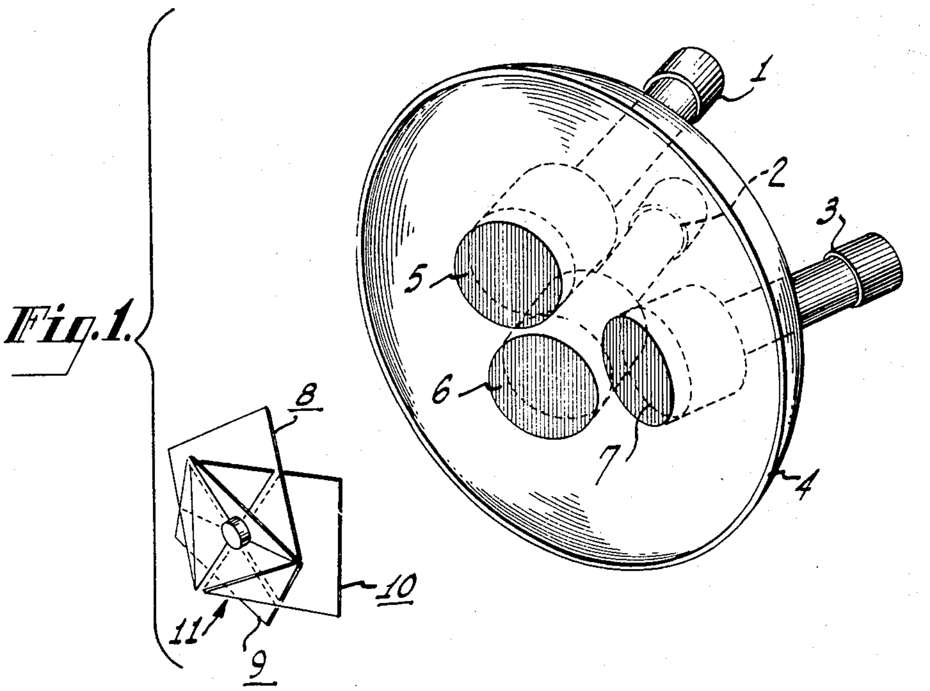
Figure 1 is a perspective view of the cluster of plane mirrors in relation to the concave mirror and the associated kinescopes.

Referring to Figure 1, three kinescopes 1, 2 and 3 are placed on the convex side of spherical mirror 4. Each of these kinescopes may be coupled to a source (not shown) of voltage waves corresponding to the intensity of a televised object in terms of one color. Each of these sources furnishes voltage waves which may have been "gamma corrected" for noise reduction purposes and to correct for certain non-linearities in the system as explained in the February, 1952, issue of "Electronics" at page 91.

On the interior surface of the spherical mirror 4, three areas 5, 6 and 7 are not covered with a coating of aluminum or other light reflecting material. For example, areas 5, 6 and 7 might be coated with materials which transmit red, blue and green respectively. These filters may be mounted in cut out portions of the concave mirror 4 unless the mirror itself is made of light transmitting material.

The image which appears on kinescope 1 will be produced by a voltage wave corresponding to the intensity of the red color components of the televised object. This image, although appearing on kinescope 1 in monochrome, will be transmitted through the dichroic area 5 and will appear red tinted when viewed from the concave side of the mirror 4. Kinescopes 2 and 3 will produce monochromatic images representative of the blue and green components respectively so that areas 6 and 7 will transmit blue and green light only.

The red light emanating from kinescope 1, after being transmitted through area 5, will fall principally upon plane dichroic mirror 8 which is one of three similar mirrors grouped in a cluster facing the concave surface of mirror 4. Plane dichroic mirror 8 is adapted to reflect only red and transmit other colors. An enlarged view of mirror 8 may be seen by referring to Figure 3 and more particularly to Figure 4.

Figure 2:
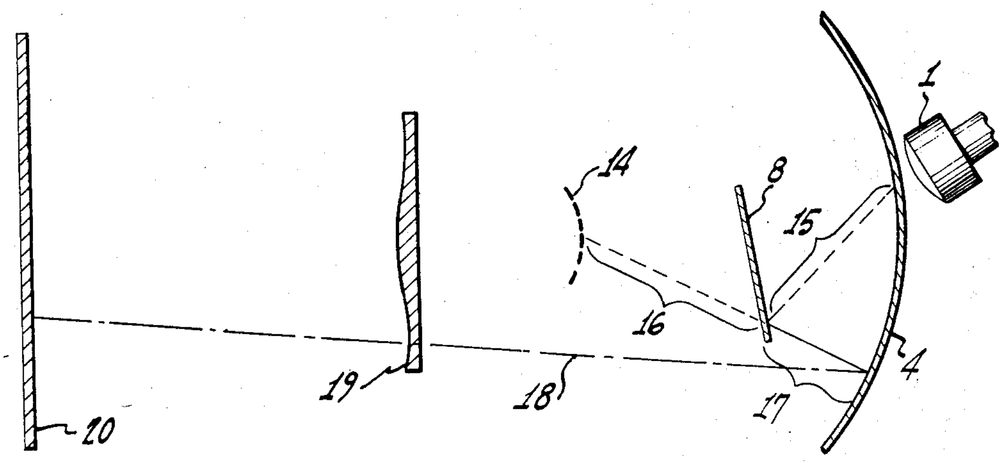
Figure 2 shows in a diagrammatic elevation view the path of a ray of light from one of said kinescopes.

Referring to Figure 2 plane mirror 8 is so positioned with respect to kinescope 1 that red light falling upon it is reflected back to the interior surface of concave mirror 4. The spatial and optical relations of the mirror 8, the concave mirror 4 and the kinescope 1 are such that a virtual image 14 of the face of kinescope 1 is formed as indicated. The path of the light from kinescope 1 shown by the broken line 15 should be exactly equal in length to the extension 16 shown in broken lines. The broken line 16 is an extension of the ray 17 which has been reflected by mirror 8 onto the aluminized surface of mirror 4. Broken line 18 indicates that the ray 17 has been reflected by mirror 4 and is transmitted by correction plate 19 onto viewing surface 20.

Figures 3, 4:
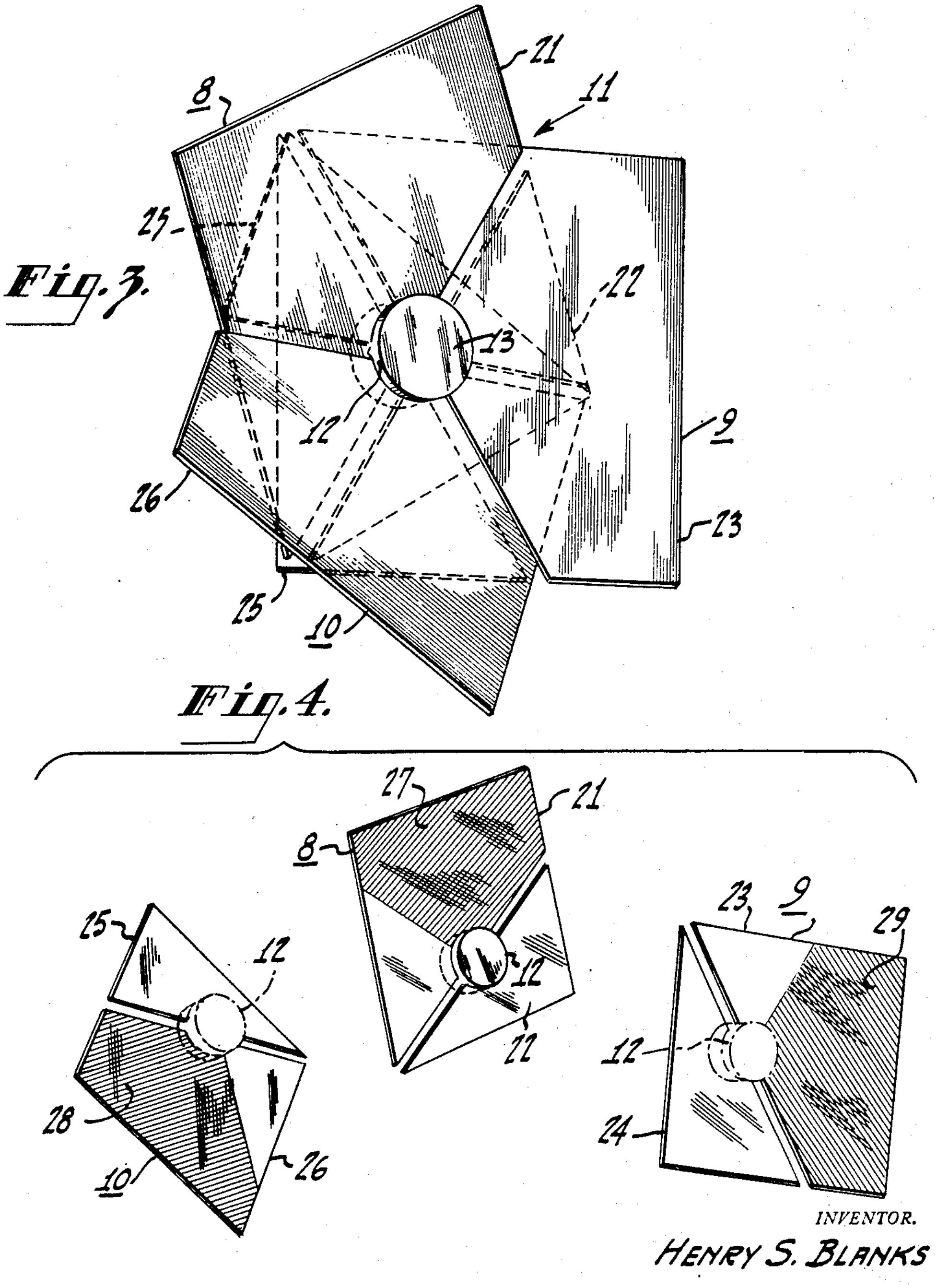
Figure 3 is a perspective view showing the reflective surfaces of the cluster of plane mirrors.
Figure 4 shows the construction and placement of each of the plane mirrors as pictured in Figure 3.

Returning to Figure 1 it is seen that the images from kinescopes 2 and 3 will pass in similar fashion through blue transmitting dichroic area 6 and green transmitting dichroic area 7 and fall upon plane dichroic mirrors 9 and 10 which reflect blue and green respectively. Enlarged views of each of these latter mirrors are also shown in Figures 3 and 4. Using the same principles that are applicable to the red ray of light previously explained in connection with Figure 2, the blue and green rays will ultimately be reflected by the mirror 4 through the correction plate 19 onto the viewing surface 20 in proper register. Thus on the viewing surface 20 a three color enlarged television image will be projected.

In Figures 3 and 4 the detailed construction of the cluster 11 may be more closely examined. A central mounting member 12 fitted with appropriate slots holds plane mirrors 8, 9 and 10 in interleaved relation to one another. Each of the plane mirrors is comprised of two segments. Thus plane mirror 8 is composed of segments 21 and 22. Plane mirror 9 is composed of segments 23 and 24. Plane mirror 10 is composed of segments 25 and 26. Mirror 8 reflects red light directly, that is to say, red light which does not pass through other parts of the cluster 11 first, onto mirror 4 only by that part 27 of its segment 21 which is cross-hatched as shown in Figure 4, whereas its segment 22 and the non cross-hatched section of segment 21 reflect red light from kinescope 1 which has passed through segment 26 of mirror 10 and segments 23 and 24 of mirror 9.

Mirror 10 reflects green light directly by the cross-hatched portion 28 of segment 26, whereas it reflects green light from segment 25 and the non cross-hatched portion of segment 26 which has passed through segments 21 and 23 of mirrors 8 and 9.

The cross-hatched portion 29 of segment 23 of mirror 9 reflects blue light directly onto mirror 4 whereas the remaining portion of segment 23 reflects blue light which has passed through segment 21 of mirror 8. The other segment 24 of mirror 9 reflects blue light which has passed through segments 25 and 26 of mirror 10 and segments 21 of mirror 8.

In summary, light transmitted by the dichroic areas 5, 6 and 7 is reflected back directly onto the concave surface of mirror 4 only by the cross-hatched portions 27, 29 and 28 of segments 21, 23 and 26 of mirrors 8, 9 and 10 respectively. Light from the kinescopes which is not reflected directly passes through one or more of the dichroic mirrors until it reaches a dichroic surface which will reflect its particular hue.

The selective reflecting characteristics of dichroic areas 5, 6 and 7 also help to improve efficiency since colors other than the ones transmitted through each of them are reflected by them, whereas the plane mirrors are so mounted that light transmitted by each of them is reflected back on the mirror 4 at such an angle that it does not pass through the same area again. Since the kinescopes can be mounted around the central axis of revolution of the concave mirror and since the cluster 11 can be placed relatively near to the mirror 4, great economy of space may be effected by use of this arrangement. To increase the contrast, one can coat the surface 13 of mounting structure 12 with a light-absorbing or non-reflecting material such as black paint or velvet. It is also possible to either blacken or cut out the central portion of the Schmitt mirror 4 to prevent unwanted reflections. Whether and to what extent this is necessary will depend on the degree of contrast desired and the space available for positioning the dichroic areas.

It is also possible to use less than three plane mirrors and a corresponding number of kinescopes for two color reproduction. One can also use the system with two plane dichoric mirrors, for example, to project images from two kinescopes on which images appear taken from two viewing angles to produce two images for a stereoscopic picture on viewing surface 20.

Having described the invention, what is claimed is:

1. Projection apparatus comprising in combination, a concave mirror having a plurality of light transmitting areas, a plurality of plane mirrors facing said concave mirror, and means for projecting each of a plurality of images from the convex side of said concave mirror through a different one of said light transmitting areas, each one of said plurality of plane mirrors being arranged to intersect each of the other of said plurality of plane mirrors along a line passing through a point common to all lines of intersection, each of said plane mirrors being adapted to reflect one of said images onto said concave mirror, said concave mirror thereupon being adapted to reflect said reflected image in a manner such as to produce an image in a given plane.

2. Apparatus for projecting a plurality of images comprising, a concave mirror having a plurality of light transmitting areas, means for projecting each of a plurality of images from the convex side of said concave mirror through a different one of said areas, a plurality of plane mirrors located on the concave side of said concave mirror, each one of said plurality of plane mirrors being arranged to intersect each of the other of said plurality of plane mirrors along a line passing through a point common to all lines of intersection, each of said plane mirrors being adapted to reflect one of said images transmitted by one of said areas onto said concave mirror, said concave mirror thereupon reflecting said reflected images so as to produce a single image in a given plane.

3. The invention as described in claim 2 wherein said common point is disposed along the axis of revolution of said concave mirror.

4. Apparatus for projecting a plurality of images produced by a plurality of display means comprising in combination, a concave mirror, said concave mirror having a plurality of areas on its concave surface which permit the images on said display means to be transmitted through them, each of said display means being positioned on the convex side of said concave mirror and in proximity to a different one of said areas respectively, and a plurality of plane dichroic mirrors mounted so as to face said concave mirror, each one of said plurality of plane dichroic mirrors being arranged to intersect each of the other of said plurality of plane mirrors along a line, said lines of intersection being common at only one point, each of said plane mirrors being adapted to reflect the image transmitted by a different one of said areas onto said concave mirror, said concave mirror thereupon reflecting said reflected images to produce a unified image.

5. The invention as described in claim 4 wherein each of said plane mirrors has at least two portions, said portions being defined by said lines of intersection.

6. Apparatus for projecting a plurality of images comprising in combination, a concave mirror having a plurality of light transmitting areas, a plurality of display means disposed on the convex side of said concave mirror, each of said display means adapted to produce a luminous image, each of said display means being situated in proximity to a different one of said areas respectively, a plurality of plane dichroic mirrors situated on the concave side of said concave mirror, each one of said plurality of plane dichroic mirrors being arranged to intersect each of the other of said plurality of plane mirrors along a line, said lines of intersection being common at only one point, said one point being on the axis of revolution of said concave mirror, each of said plane mirrors being adapted to reflect light from one of said luminous images transmitted by one of said areas onto said concave mirror, a correction lens situated on the concave side of said concave mirror symmetrically placed about said axis of revolution, said concave mirror being adapted to reflect said reflected images through said correction lens to produce an image in a given plane.

7. The invention as described in claim 6 wherein each of said light transmitting areas is adapted to transmit light of a particular frequency portion of the spectrum of visible light and reflect all other frequency portions of said spectrum.

8. The invention as described in claim 6 wherein each of said plane mirrors is adapted to reflect light of a particular frequency portion of the visible spectrum and transmit light of other frequency portions of said spectrum.

9. The invention as described in claim 6 wherein each of said light transmitting areas includes a dichroic filter and wherein each of said plane mirrors is a dichroic filter.

10. A system for superposing a plurality of projected images in substantially accurate register to be viewed as a single image by an observer comprising in combination, a plurality of luminous image sources, a spherical concave mirror, said concave mirror having a plurality of areas each of which is in proximity to a different one of said luminous images producing means respectively, each of said areas being adapted to transmit light from a different part of the visible spectrum, three plane dichroic mirrors, each one of said three plane mirrors intersecting each of the other of said three plane mirrors along a line, said lines of intersection being common at only one point, each of said plane mirrors having at least two portions, said portions being defined by said lines of intersection and mounted on a common supporting member, each of said plane mirrors being adapted to transmit parts of the visible spectrum not reflected by it, each of said plane mirrors being adapted to reflect light of each part of the visible spectrum transmitted by a different one of said areas respectively, onto said spherical concave mirror, and a correcting lens, said spherical concave mirror thereupon reflecting said light through said correcting lens to form a single image in a given plane.

References Cited in the file of this patent

UNITED STATES PATENTS

| | | |
|---|---|---|
| 2,295,779 | Epstein | Sept. 15, 1942 |
| 2,477,331 | Epstein | July 26, 1949 |
| 2,489,299 | Larson | Nov. 29, 1949 |
| 2,590,240 | Epstein | Mar. 25, 1952 |
| 2,672,502 | Albright | Mar. 16, 1954 |

FOREIGN PATENTS

| | | |
|---|---|---|
| 1,048,976 | France | Aug. 12, 1953 |